United States Patent [19]

Deram et al.

[11] Patent Number: 4,607,862

[45] Date of Patent: Aug. 26, 1986

[54] MOBILE MACHINE COMPRISING A STABILIZING DEVICE

[75] Inventors: Georges E. Deram, Saint-Pathus; Maurice A. Panczyk, Le Plessis Belleville, both of France

[73] Assignee: Poclain, Le Plessis Belleville, France

[21] Appl. No.: 696,333

[22] Filed: Jan. 29, 1985

[30] Foreign Application Priority Data

Feb. 13, 1984 [FR] France ............................... 84 02163

[51] Int. Cl.4 ............................................... B60S 9/12

[52] U.S. Cl. ................................. 280/765.1; 212/189

[58] Field of Search ..................... 212/189; 280/763.1, 280/764.1, 765.1, 766.1

[56] References Cited

U.S. PATENT DOCUMENTS

| | | | |
|---|---|---|---|
| 2,929,517 | 3/1960 | Phillips | 280/764.1 |
| 3,716,252 | 2/1973 | Johnson | 280/766.1 |
| 4,241,803 | 12/1980 | Lauber | 212/189 X |

FOREIGN PATENT DOCUMENTS

| | | | |
|---|---|---|---|
| 0124024 | 11/1984 | European Pat. Off. . | |
| 1277764 | 9/1968 | Fed. Rep. of Germany . | |
| 2287412 | 5/1976 | France . | |
| 2418126 | 9/1979 | France . | |
| 2474415 | 7/1981 | France . | |
| 1035955 | 7/1966 | United Kingdom | 280/765.1 |

*Primary Examiner*—John J. Love
*Assistant Examiner*—Michael Mar
*Attorney, Agent, or Firm*—Mason, Fenwick & Lawrence

[57] ABSTRACT

The present invention relates to a mobile machine comprising a frame, a beam mounted on the frame and a stabilizing device comprising two arms, each arm being mounted on the beam, pivoting about a pin, being coupled to a first member for adjusting its pivoting with respect to the beam and supporting a sole plate for abutment on the ground, and the pivot pins of the two arms being parallel. The beam is mounted to pivot with respect to the frame about a pin at right angles to the pivot pins of the arms, while a second member for adjusting the pivoting of the beam with respect to the frame is coupled between this beam and this frame. The invention is more particularly applicable to producing a machine which is very stable in operation and having a good ground clearance.

11 Claims, 6 Drawing Figures

MOBILE MACHINE COMPRISING A STABILIZING DEVICE

The present invention relates to a mobile machine comprising a stabilizing device.

Numerous public works machines, such as cranes or hydraulic shovels, self-propelled or simply mobile, are stabilized whilst their working attachments are in operation.

This momentary increase in the stability avoids the machine tipping over under the effect of the load lifted or the digging effort.

The principle of the increase in stability consists in increasing the polygon of support by providing the machine with rigid bearing zones, as remote as possible from the frame of the machine, these zones being constituted by bearing pads which are retractable whilst the machine is moving.

The maximum spaced apart relationship of the bearing pads in operation and a satisfactory retraction during displacement are two antinomic conditions, the condition of retraction prevailing due to the regulations of laws governing road traffic.

It is an object of the invention to overcome this antinomy by adopting the technique of articulated elements, by increasing the ground clearance of the prior known solutions, by ensuring a bearing surface greater than that of the prior known solutions.

The invention therefore relates to a mobile machine comprising a frame, a beam mounted on the frame and a stabilizing device comprising at least two arms, each arm being mounted on the beam, pivoting about a pin, being coupled to a first member for adjusting its pivoting with respect to said beam and supporting a sole plate for abutment on the ground, and the pivot pins of the two arms with respect to the beam being parallel.

In a machine according to the invention, the beam is mounted to pivot with respect to the frame about a pin which is at right angles to the pivot pins of the said two arms, whilst a second member for adjusting the pivoting of the beam with respect to the frame is coupled between this beam and this frame.

The following advantageous arrangements are also preferably adopted:

the sole plate supported by each arm is mounted at the end of this arm which is opposite the pivot pin of said arm;

each arm possesses two extreme positions of pivoting with respect to the beam, which are separated by an arc of pivoting substantially greater than 90°, in which, the beam being placed in the configuration of use of the stabilizing device, in a first position, said arm extends beneath the beam, substantially parallel to said beam and, in a second position, said arm extends obliquely with respect to the beam, its sole plate being spaced apart from the beam and substantially horizontal, whilst, the beam still being placed in the configuration of use of the stabilizing device, on the one hand, in its first position, the arm has a first of the faces defining it, opposite the beam, substantially horizontal and capable of constituting a bearing face for the arm on the ground distinct from the sole plate of said arm, on the other hand, the distances separating said first face, in the first position of the arm, and said sole plate, in the second position of the arm with respect to a horizontal plane are substantially equal;

in the first position of an arm, a second of the faces defining it is adjacent the lower face of the beam and is in abutment on said beam;

the first member for adjusting the pivoting of each arm with respect to the beam is constituted by an assembly of two connecting rods forming beam and by a pressurized fluid jack, a first of these two rods connecting, by means of two pivot pins, one end of the jack to the beam and, the second of the two rods connecting, by means of two pivot pins, said end of said jack to said arm;

the ends of the first and of the second connecting rods of two rods corresponding to an arm, connected to the same end of the jack, are mounted to pivot about a common axis;

the first members for adjusting the pivoting with respect to the beam of the two arms have a common pressurized fluid jack, of which a first end is connected to the first and second rods for adjusting the position of a first of said two arms, and of which the second end is connected to the first and second rods for adjusting the position of the second of said two arms.

The invention makes it possible, in particular, to obtain a considerable spaced apart relationship of the sole plates in operation and a satisfactory retraction whilst the machine is travelling on the highway, as well as a non-reduced ground clearance.

The invention will be more readily understood on reading the following description with reference to the accompanying drawings, in which.

Figure 1:
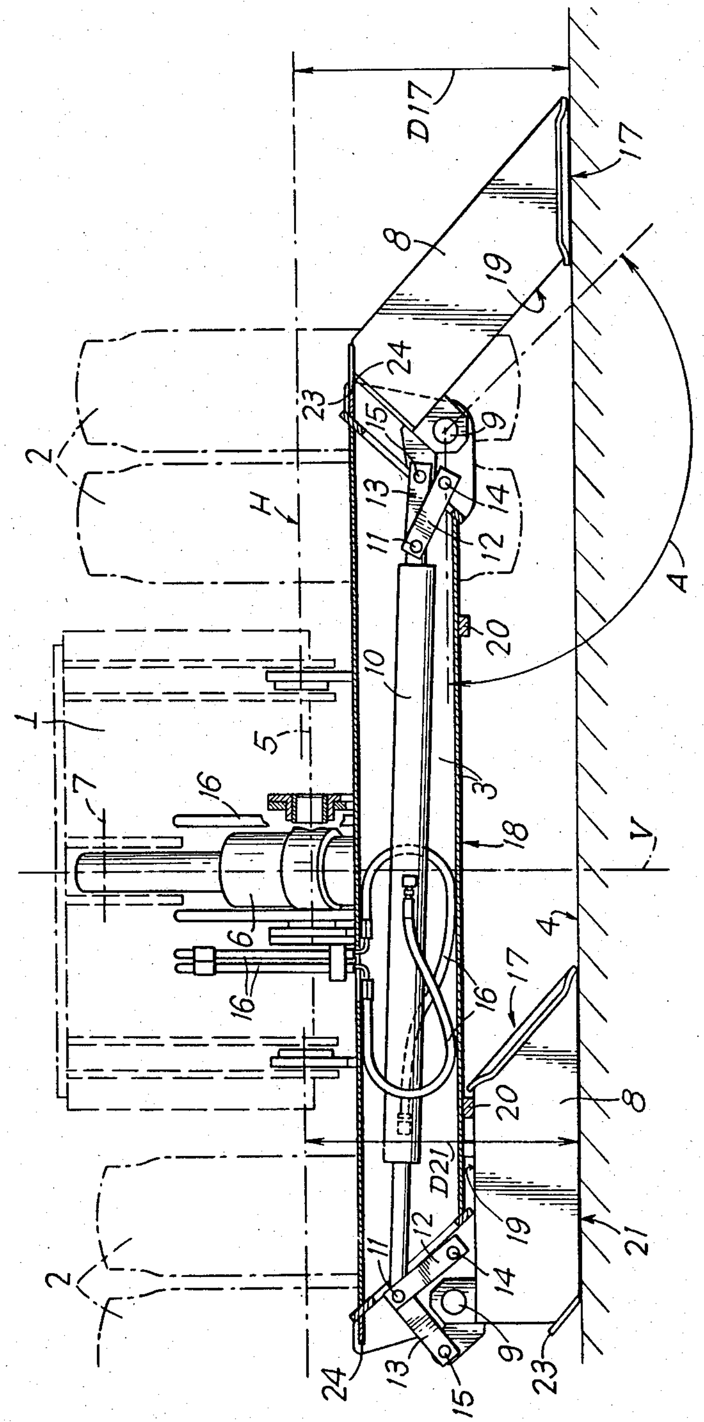
FIG. 1 is a rear view of a hydraulic shovel comprising a stabilizing device according to the invention shown in a first configuration.

Referring now to the drawings, the machine shown in the Figures is constituted by:

a frame 1;

two pairs of twin wheels 2;

a beam 3 disposed horizontally, parallel to the surface 4 of the ground, and to the horizontal plane H passing through the axis of rotation of the wheels 2, mounted on the frame 1, pivoting about a transverse horizontal pin 5;

a hydraulic jack 6 for adjusting the position of the beam 3 with respect to the frame 1, coupled (7) between this beam 3 and this frame 1;

two arms 8, each mounted to pivot at one end of the beam 3, about pins 9 parallel to each other and at right angles to the pivot pin 5 of the beam 3 with respect to frame 1;

a hydraulic jack 10 for adjusting the position of the arms 8 with respect to the beam 3, of which the ends are coupled, by pins 11 to first ends of first connecting rods 12 and second connecting rods 13, whilst the second ends of said rods are mounted to pivot, those of the first rods 12, by pins 14, with respect to beam 3, and those of the second rods 13, by pins 15, with respect to arms 8;

flexible pipes 16 for supply and evacuation of the hydraulic fluid controlling the jacks 6 and 10.

Figure 2:
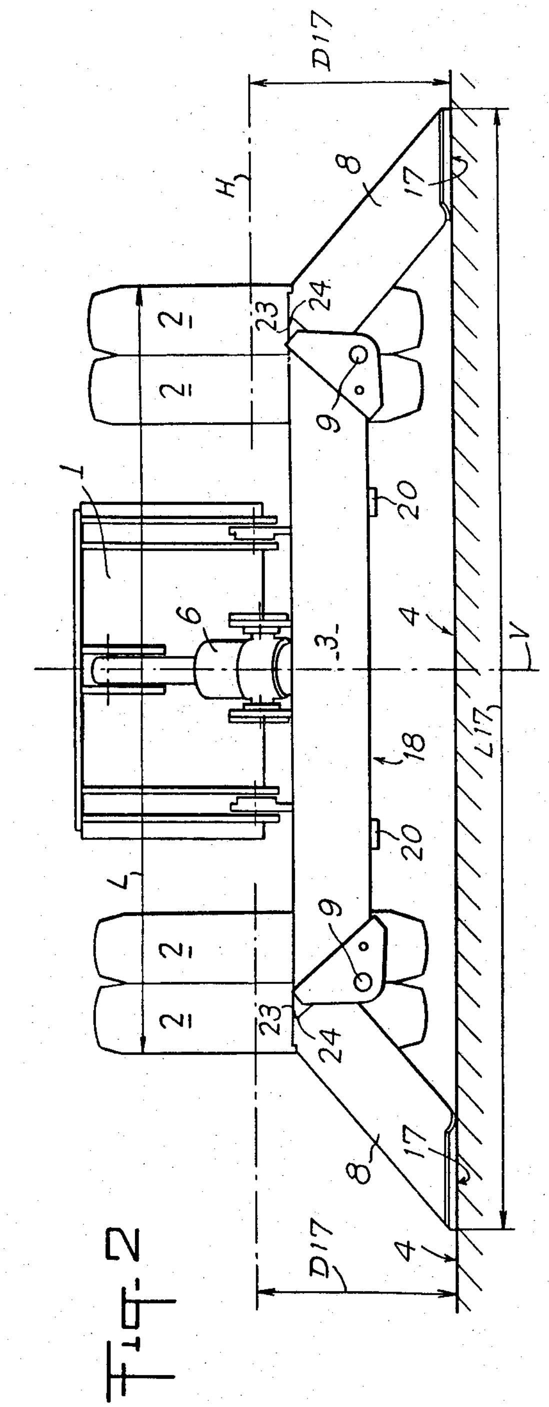
FIGS. 2, 3, 4 and 6 are rear views of the same shovel, the stabilizing device being placed in second, third, fourth and fifth configurations, respectively.
Figure 3:
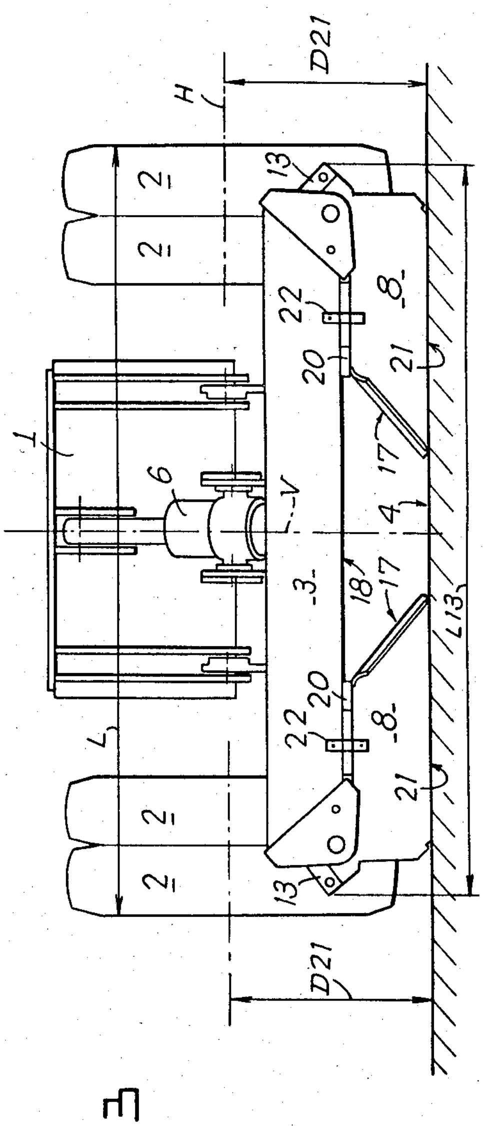
Figure 4:
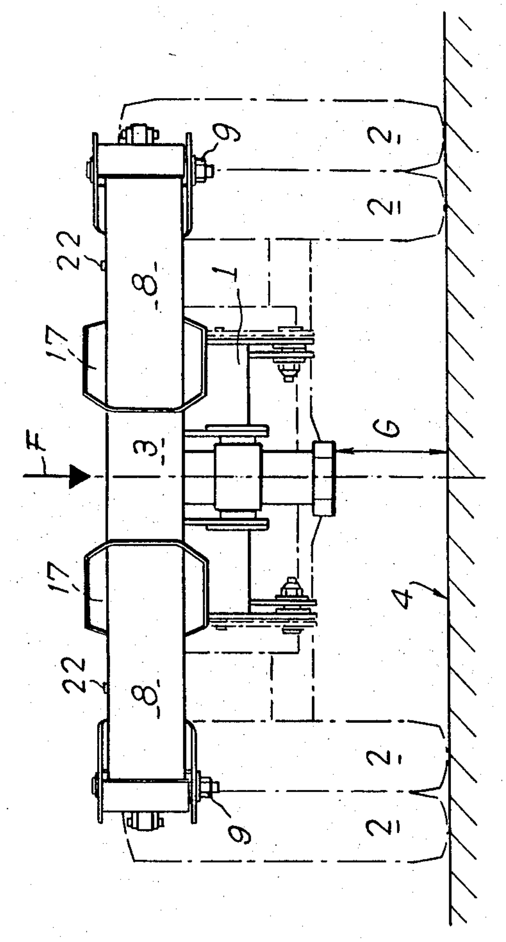
Figure 5:
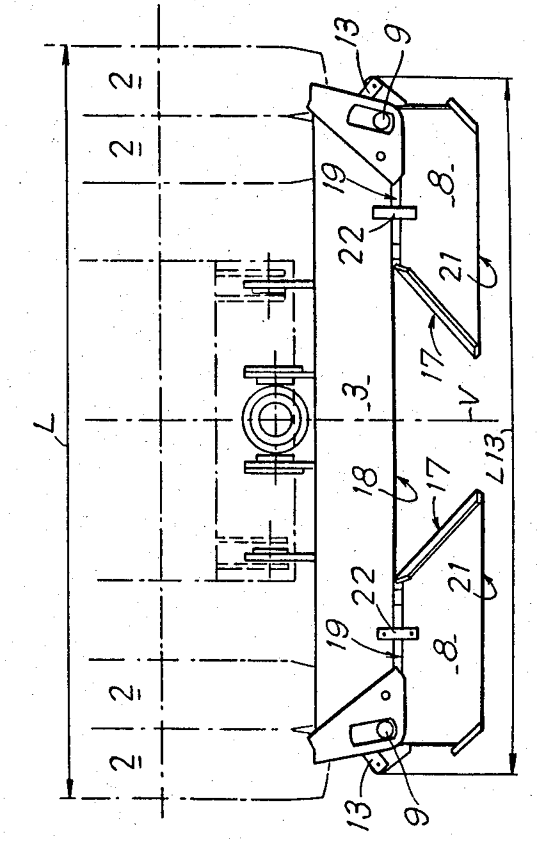
FIG. 5 is a view in the direction of arrow F of FIG. 4.
Figure 6:
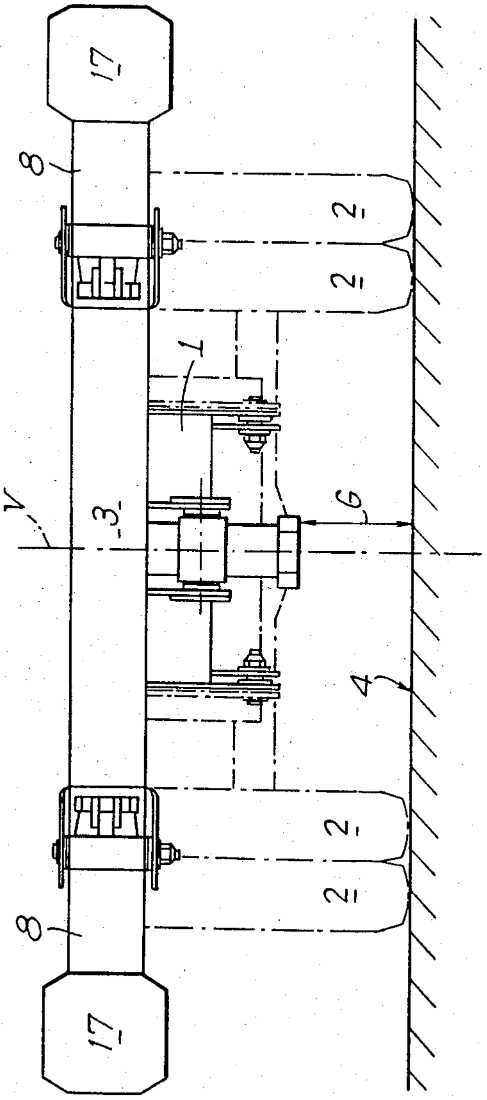

The following structural arrangements may be observed:

the ends of the arms 8, opposite those by which they are mounted to pivot on the beam 3, are provided with sole plates 17 for abutment of the arms on the surface 4 of the ground;

the first connecting rods 12 oblige each pin 11 to describe an arc of circle with respect to the corresponding pin 14, fixed with respect to beam 3;

the beam 3 may pivot between two extreme positions, one shown in FIGS. 1, 2 and 3, the other in FIGS. 4, 5 and 6, the arc of pivoting separating these positions being approximately equal to 90°, and the corresponding pivoting placing one (18) of the faces defining the beam 3, horizontal and lower in the position of FIGS. 1, 2 and 3, and vertical and directed opposite the frame 1, towards the outside of the machine, in the position of FIGS. 4, 5 and 6;

the maximum clearance (A) of pivoting of each arm 8 with respect to the beam 3 is substantially greater than 90°, and, in the positions of the beam 3 shown in FIGS. 1, 2 and 3, makes it possible to place each arm 8 *either* substantially parallel to the beam 3, by being oriented towards the median, vertical, longitudinal plane V of the machine and having one (19) of the faces defining it in abutment on the lower face 18 of the beam 3 via a stop 20, so that another face 21 defining it, opposite face 19, is in abutment on the surface 4 of the ground, *or* obliquely with respect to the beam 3, by being oriented towards the ground and outwardly with respect to said median plane V so that its sole plate 17 is in abutment on the surface 4 of the ground;

in the position of FIG. 1, the arm 8, to the left in the figure, has its face 21 in abutment on the surface 4 of the ground and at a distance D21 from the plane 4, whilst the other arm 8, located to the right in the Figure, is in abutment on the surface 4 by its sole plate 17, itself located at a distance D17 from the plane 4, the distances D21 and D17 being substantially equal;

when an arm 8 is disposed parallel to the beam 3 and consequently oriented towards the median vertical plane V (FIG. 1 concerning the left-hand arm; FIG. 3, FIG. 4 and FIG. 5 for the two arms), this arm (or these arms) may be maintained in abutment on the stop 20 of the beam 3 by means of removable fasteners 22;

when the two arms 8 are disposed parallel to the beam 3, the maximum dimensions L13 of the stabilizing device are less and contained in the width L of the machine, whilst, when the arms 8 are disposed obliquely, towards the outside with respect to the median vertical plane V, the maximum dimensions L17 are very substantially greater than the width L of the machine, the ends of the sole plates 17 passing beyond the planes defining the width of the machine;

in the position of FIGS. 4, 5 and 6, the stabilizing device in no way reduces the ground clearance G of the machine, defined by the shortest distance of the underneath of the machine with respect to the surface 4 of the ground, as the beam 3 is then disposed substantially higher than the lowest part of the machine;

finally, when an arm 8 is disposed obliquely and outwardly, as in the position of FIG. 2, its clearance of pivoting is limited by the contact of a face 23 defining it with a stop 24 with which the beam 3 is provided.

The advantages of the machine will be apparent hereinafter from the explanation of the various phases of the operation thereof.

Firstly, in operation, the polygon of support obtained may have a considerable width L17 (FIG. 2) and allow satisfactory stability of the machine to be obtained, the arms 8 being firmly in abutment by their faces 23 on the stops 24 of the beam.

If the size of the work site does not make it possible to extend the arms 8 outwardly on one side or on both sides, it is still possible (FIGS. 1 and 3) to place the machine in abutment either on a sole plate 17 and a face 21, or on the two faces 21 of the arms 8, and thus obtain a considerably improved stability with respect to that corresponding to the machine at rest on the ground via the wheels 2.

Moreover, when the stabilizing device is not in operation, it may be placed (FIGS. 4 and 5) in a position in which it does not constitute a hindrance regarding the gauge of the machine, either in width (L13 less than L) or in ground clearance (G).

Of course, starting from the non-operational position of the stabilizing device (FIGS. 4 and 5), it is easy to remove the removable fasteners 22 (or one fastener 22 only), then to control retraction of the jack 10 to orient the arms 8 obliquely towards the outside with respect to the median vertical plane V (FIG. 6), in order finally to control the pivoting of the beam 3 by means of the jack 6 until the sole plates 17 of the two arms are in abutment on the surface 4 of the ground and the machine is raised, separating the wheels 2 from the ground (FIG. 2).

The invention is not limited to the embodiment shown, but covers, on the contrary, all variants which may be made thereto without departing from its scope nor its spirit.

For example, instead of being provided with removable fasteners 22, for maintaining an arm 8 in abutment on the stop 20, the arrangement according to the invention may be provided, for each arm 8, with a complementary connecting rod, mounted to pivot about the pin 9 and having its end provided with a catch adapted to occupy two distinct positions: *in a first position*, the catch is introduced into a housing in this arm about pin 9; *in a second position*, this catch is introduced into a housing made in the connecting rod 13, between pins 11 and 15 and, by immobilizing this connecting rod, at the same time immobilizes the arm 8 in the position, for example, of the left-hand arm 8 of FIG. 1.

Similarly, it is known to use two identical jacks for controlling the same element, when this element is of large dimensions. In this way, instead of one sole jack 6, it would be possible to provide two identical jacks to adjust the position of the beam 3. It would also be possible to couple two jacks in parallel between the pins 11, instead of the single jack 10 shown.

What is claimed is:

1. In a mobile machine comprising a frame, a beam mounted on the frame, and a stabilizing device, the stabilizing device comprising at least two arms, means pivotally mounting each arm on the beam for pivotal movement about a pin and each arm being coupled to a first member for adjusting its pivoting with respect to said beam and supporting a sole plate for abutment on the ground, the pivot pins of the two arms with respect to the beam being parallel, means mounting the beam to pivot with respect to the frame about a pin which is at right angles to the pivot pins of the two arms, a second member for adjusting the pivoting of the beam with respect to the frame coupled between the beam and the frame, each arm being movable between two extreme positions of pivoting with respect to the beam, which are separated by an arc of pivoting substantially greater than 90°, wherein when the beam is placed in the configuration of use of the stabilizing device, in a first position, said arm is folded beneath the beam, substantially parallel to said beam and, in a second position, said arm extends obliquely with respect to the beam, its sole plate being spaced apart from the beam and substantially horizontal, and when the beam is placed in the configuration of use of the stabilizing device, on the one hand, in its first position, the arm has a first of its faces, opposite the beam, disposed substantially horizontal and capable of constituting a bearing surface for the arm on the ground distinct from the sole plate of said arm, and on the other hand, the distances separating said first face, in the first position of the arm, and said sole plate, in the second position of the arm with respect to a horizontal plane are substantially equal.

2. The machine of claim 1, wherein, in the first position of an arm, a second face of the arm is adjacent the lower face of the beam and is in abutment with said beam.

3. The machine of claim 2, wherein the first member for adjusting the pivoting of each arm with respect to the beam is constituted by an assembly of two connecting rods and by a pressurized fluid jack, a first of these two rods connecting by means of two pivot pins, one end of the jack to the beam and, the second of the two rods connecting, by means of two pivot pins, said end of said jack to said arm.

4. The machine of claim 3, wherein the ends of the first and of the second connecting rods of the two rods associated with an arm, connected to the same end of the jack, are mounted to pivot about a common axis.

5. The machine of claim 4, wherein the first members for adjusting the pivoting with respect to the beam of the two arms have a common pressurized fluid jack, of which a first end is connected to the first and second rods for adjusting the position of a first of said two arms, and of which the second end is connected to the first and second rods for adjusting the position of the second of said two arms.

6. The machine of claim 3, wherein the first members for adjusting the pivoting with respect to the beam of the two arms have a common pressurized fluid jack, of which a first end is connected to the first and second rods for adjusting the position of a first of said two arms, and of which the second end is connected to the first and second rods for adjusting the position of the second of said two arms.

7. The machine of claim 1, wherein the first member for adjusting the pivoting of each arm with respect to the beam is constituted by an assembly of two connecting rods and by a pressurized fluid jack, a first of these two rods connecting, by means of two pivot pins, one end of the jack to the beam and, the second of the two rods connecting, by means of two pivot pins, said end of said jack to said arm.

8. The machine of claim 7, wherein the ends of the first and of the second connecting rods of the two rods associated with an arm, connected to the same end of the jack, are mounted to pivot about a common axis.

9. The machine of claim 8, wherein the first members for adjusting the pivoting with respect to the beam of the two arms have a common pressurized fluid jack, of which a first end is connected to the first and second rods for adjusting the position of a first of said two arms, and of which the second end is connected to the first and second rods for adjusting the position of the second of said two arms.

10. The machine of claim 7, wherein the first members for adjusting the pivoting with respect to the beam of the two arms have a common pressurized fluid jack, having a first end connected to the first and second rods for adjusting the position of a first of said two arms and of having a second end connected to the first and second rods for adjusting the position of the second of said two arms.

11. The machine of claim 1, wherein the sole plate supported by each arm is mounted at the end of such arm which is opposite the pivot pin of said arm.

* * * * *